June 22, 1943.  H. M. ZENOR  2,322,681
CONDENSER GRAVITY METER
Filed July 29, 1938  2 Sheets-Sheet 1
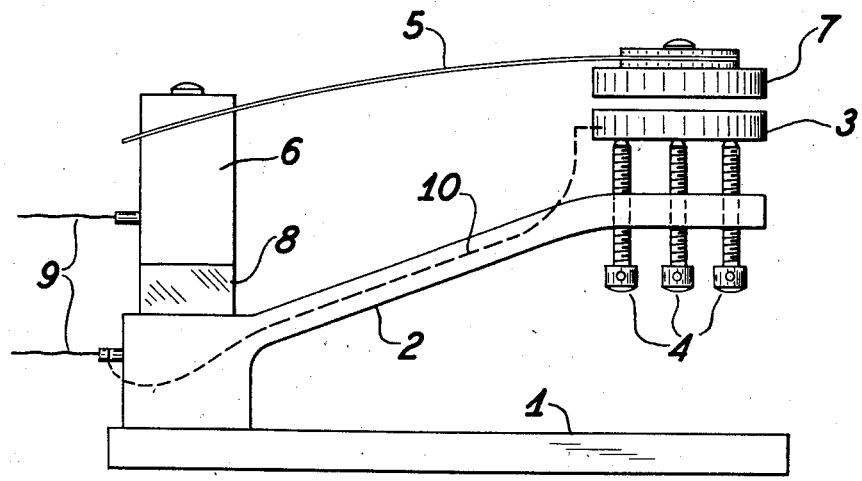
FIG_1_
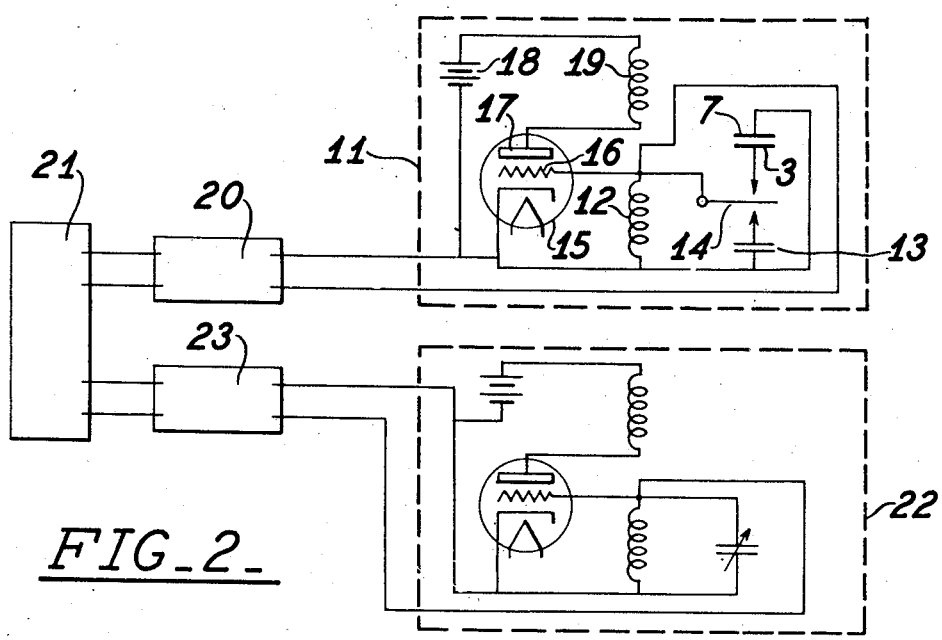
FIG_2_
INVENTOR.
BY Hughes M Zenor
ATTORNEY.

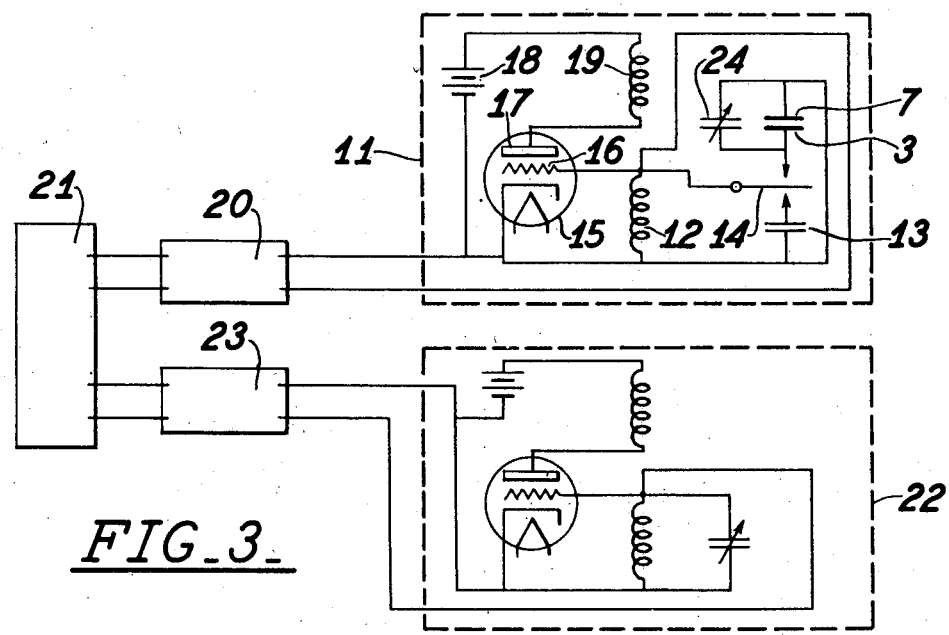
FIG_3_
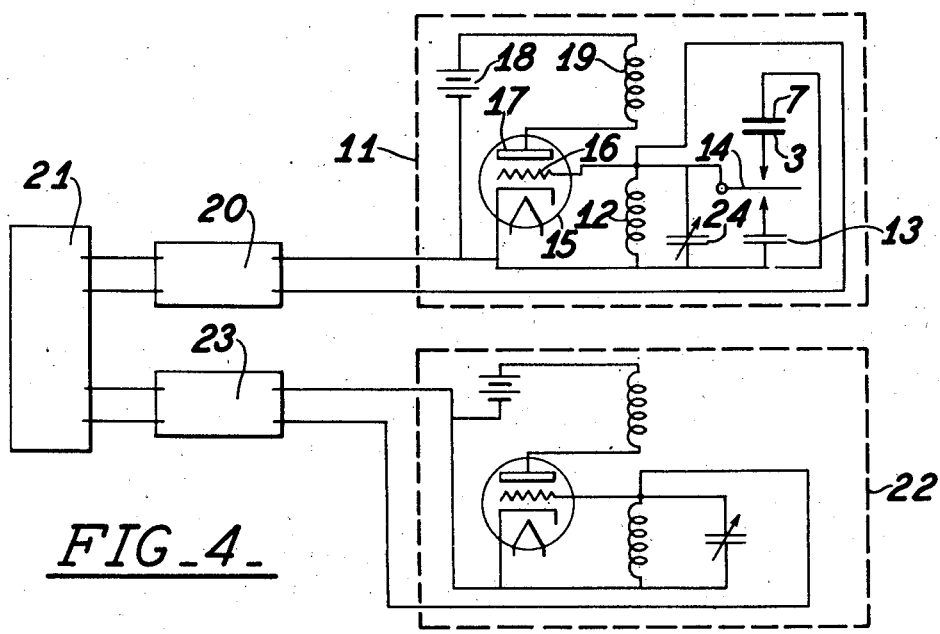
FIG_4_

Patented June 22, 1943

2,322,681

UNITED STATES PATENT OFFICE 2,322,681

CONDENSER GRAVITY METER

Hughes M. Zenor, Houston, Tex., assignor to Standard Oil Development Company, a corporation of Delaware Application July 29, 1938, Serial No. 221,881

5 Claims. (Cl. 265—1.4)

The present invention is directed to an instrument for making geophysical measurements and particularly to a gravity meter. The principles utilized in the gravity meter embodiment of the present invention are also applicable to seismic pickups and to instruments for measuring small displacements.

It has hitherto been proposed in the construction of gravity meters to connect the weight which is utilized to react to changes in gravity to a plate of a condenser the other plate of which is fixed. This condenser is made a part of an oscillating circuit the frequency of which is compared to a fixed frequency. The theory of operation is that the movement of the weight will vary the distance between the plates of the condenser thereby varying its capacity and varying the frequency of the oscillating circuit of which it is a part. The variation in the beat frequency between the oscillating circuit and the fixed frequency is relied upon as a measure of gravity change.

In gravity measurements of geophysical significance the changes which are to be observed are extremely small, being as low as 0.1 of a milligal. This value measured in terms of changes in capacity of the condenser is extremely small. In practice, the construction described above suffers from the drawback that in the oscillating circuit, of which the condenser is a part, there are other factors such as inductance, resistance, di-electric losses, battery voltages, inter-electrode capacity of the oscillator tube, etc., which will vary with temperature, during transportation, and with time, and which may introduce into the oscillating circuit a change of frequency greater than the change of frequency effected by the change in distance between the plates of the condenser due to the changes in gravity.

In such a system, it will be necessary to maintain all of the elements of each of the oscillating circuits closely enough constant so that the changes in frequency due to variations in these elements will be smaller than the change in frequency produced by the smallest change in gravity which it is desired to measure.

According to the present invention, many of the disadvantages of an instrument in which displacements due to changes in gravity, or any other displacements, are reflected in changes in capacity of a measuring condenser are eliminated by providing an additional fixed condenser having a capacity the same as the capacity of the measuring condenser at some predetermined base station, whereby the measurement is made a function of the change in capacity of the measuring condenser rather than a function of the capacity of the measuring condenser as a whole.

More specifically, the gravity meter of the present invention is provided with a measuring condenser, herein called gravity meter condenser, one plate of which is fixed and the other plate movable by gravity, such that a change in gravity will cause a change in capacity of the condenser, i. e., the capacity of this gravity meter condenser is a function of the intensity of the gravitational field at the position of the movable plate. Also provided is a fixed condenser having a capacity equal to the capacity of the gravity meter condenser at some predetermined base point. A switch is provided for connecting either of these condensers into an oscillating circuit, hereinafter referred to as the measuring circuit, such that a change in the connected capacity will change the frequency of the oscillating circuit. By any of the methods subsequently described, the difference between the capacity of the gravity meter condenser and the capacity of the fixed condenser which is indicated by a difference in frequency of the oscillating circuit when the fixed condenser is substituted for the gravity meter condenser, or vice versa, is determined. As the fixed condenser was adjusted so that its capacity was equal to the capacity of the gravity meter condenser at a base station, the difference between the capacity of the gravity meter condenser and the capacity of the fixed condenser at any point other than the base station will be a measure of the difference in gravity between the station for which the measurement is being made and the base station.

The advantages of this invention over the previously described method are apparent. First of all, the necessity for a second oscillating circuit with fixed frequency remaining constant over a long period of time is eliminated. In the previous method, this frequency, as mentioned above, must be kept constant with an accuracy equal to that of the required frequency measurements during the time necessary to make measurements at all the stations at which it is desired to measure the value of gravity. Second, any variations of the other parameters of the oscillating circuit of which the gravity meter condenser or fixed condenser is a part, such as inductance, resistance, di-electric losses, battery voltages, inter-electrode capacities of the oscillator tube, etc., will in this method affect the variation of frequency by approximately the same percentage as they affected the total frequency in the former method; since the variation in frequency due to a change in gravity is a small fraction of the frequency, the accuracy of the gravity measurements is correspondingly increased.

The change in frequency can be measured in a number of different ways. For example, a second oscillator circuit, which may be termed a comparison circuit, with variable frequency can be provided. The oscillation from the measuring oscillating circuit is heterodyned with the oscillation from this comparison circuit. The frequency of the comparison circuit is adjusted to give a predetermined beat frequency, for example, zero beat, when the gravity meter condenser is connected in the measuring oscillator circuit. Then, without changing the frequency of the comparison oscillator, the fixed capacity is substituted for the gravity meter condenser in the measuring oscillator circuit and the change in beat frequency determined. This change is the measure of the difference in gravity between the station for which the measurement is being made and the value of gravity at the base station.

In another method, the comparison oscillating circuit contains a variable comparison condenser of such a size that its maximum variation in capacity is just sufficient to cover the frequency range corresponding to the range of gravity values to be encountered. With the gravity meter condenser in the measuring oscillator circuit, the variable comparison condenser is set at a predetermined scale value. The beat frequency is adjusted to a predetermined value, for example, zero. The fixed condenser is now switched into the measuring oscillator circuit, and the variable comparison condenser is adjusted to give the same value of beat frequency. The variation in the variable comparison condenser is a measure of the difference between the gravity meter condenser and the fixed condenser.

A preferred embodiment of this invention provides a variable condenser which is connected in parallel with the gravity meter condenser. The maximum capacity of this variable condenser is equal to the maximum variation expected in the capacity of the gravity meter condenser. In this embodiment, variations in the other parameters of the oscillating circuit have no effect on the accuracy of measurement. The only limits to the accuracy of measurement are the accuracy with which the variations in the variable condenser can be read and the accuracy with which the capacity of the fixed condenser remains constant. The first of these factors presents little difficulty, as condensers are commercially available that are sufficiently accurate for this purpose. It is to be remembered that inaccuracies in this variable condenser produce inaccuracies of only the same amount in the measurement of the variation of the gravity meter condenser, so that, if the variations are to be read with an accuracy of 1%, the variations in capacity of the variable capacity must be known to 1%. A change of 1% in the variation of the gravity meter condenser capacity would correspond to an accuracy of, perhaps, one thousandth of one percent in the measurement of the total capacity. The other limitation on the accuracy of this method, that is the constancy of the fixed condenser, is not serious since, as can readily be seen, a construction similar to that of the gravity meter condenser will give a higher degree of accuracy than that of the gravity meter condenser, since the support of each plate can be made rigid.

In using this preferred embodiment, the gravity meter is set in position at a station, which we may call the base station, and the switch in the measuring oscillating circuit is manipulated to place the fixed condenser in the measuring oscillating circuit. The frequency of this circuit is then beat against a second or reference oscillating circuit, the frequency of which is adjusted by varying the capacity or the inductance, or both, of the circuit until the zero beat frequency is obtained. The switch is then manipulated so as to put the gravity meter condenser and the variable condenser in the measuring oscillating circuit, and the frequency of the measuring oscillating circuit is beat against the frequency of the reference circuit. Without changing any of the constants of the reference circuit, the variable condenser in the measuring oscillating circuit is then adjusted until a zero beat frequency is obtained. The capacity of the gravity meter condenser and the variable condenser in parallel is then equal to the capacity of the fixed condenser. The gravity meter is then set in position at a new station, which we may call a field station, and the manipulations above described are repeated in the same order. The difference between the capacities of the variable condenser at the two stations when the beat frequency was obtained is then taken as the change in capacity of the gravity meter condenser, due to the difference in gravity between the base station and the field station. The same procedure is followed at each subsequent field station.

A modification of the preferred embodiment of this invention provides a variable condenser which is so connected as to be in parallel with whichever of the condensers, either gravity meter or fixed, is connected by means of the switch into the measuring oscillating circuit.

In this modification of the preferred embodiment, the gravity meter is set in position at a station, which we may call the base station, and the switch in the measuring oscillating circuit is manipulated to place the fixed condenser in the measuring oscillating circuit. The frequency of this circuit is then beat against a second or reference oscillating circuit the frequency of which is adjusted, by varying the capacity or the inductance, or both, of the reference circuit until a zero beat frequency is obtained. The switch is then manipulated so as to put the gravity meter condenser in the measuring oscillating circuit and, again, the frequency of the measuring oscillating circuit is beat against the frequency of the reference circuit. Without changing any of the constants of the reference circuit, the variable condenser in the measuring oscillating circuit is then adjusted until a zero beat frequency is obtained. The gravity meter is then set in position at a new station which we may call a field station. With the gravity meter condenser in the circuit and the setting of the variable condenser undisturbed from its last reading at the base station, the frequency of the circuit is beat against the reference circuit; the frequency of this reference circuit is now adjusted until a zero beat frequency is obtained. The switch is then manipulated so as to connect the fixed condenser in the measuring oscillating circuit and, without changing the frequency of the reference oscillating circuit, the variable condenser in the measuring circuit is adjusted until a zero beat frequency is again obtained. The difference between the capacities of the variable condenser in the measuring circuit at the two stations when a zero beat frequency was obtained with the fixed condenser in the measuring circuit is then taken as the change in capacity of the gravity meter condenser due to the difference in gravity between the base station and the field station.

It will be noted that in the procedure described above the variable condenser in the measuring circuit is fixed at a certain value at the base station and this value is not altered at the first field station until the fixed condenser is thrown into the measuring circuit. In this way, the two important readings are the readings of the variable condenser of the measuring circuit with the fixed condenser in the measuring circuit at each station. Before proceeding to a second field station, the gravity meter condenser is again thrown into the measuring circuit and, without changing the reference circuit, the variable condenser of the measuring circuit is adjusted until zero beat frequency is obtained with respect to the reference circuit. At each subsequent field station the manipulations described for the first filed station are repeated. It will be apparent that by this procedure the gravity change read at each field station is relative to the preceding field station.

The operations described above can be modified, if desired. That is to say, at the base station the gravity meter condenser may first be placed in the measuring circuit with the variable condenser set at a predetermined scale position and the capacity or the inductance of the reference circuit manipulated to give zero beat frequency. Then the fixed condenser is connected into the measuring circuit and the variable condenser of the measuring circuit adjusted until zero beat frequency is obtained. The difference in capacity of the variable condenser required to give zero beat in the two connections is then equal to the difference in capacities of the gravity meter and the fixed condensers. These two operations are then repeated at each field station. When proceeding in this manner, all of the readings of the variable condenser in the measuring circuit must be recorded and used in computing gravity change from station to station. In any of the above descriptions of possible procedures it is obviously possible to interchange the fixed and the gravity meter condensers without altering the principle of the procedure.

The above features of the gravity meter of the present invention reside in differences between the measuring circuit of the gravity meter of the present invention and the measuring circuit of the gravity meter heretofore known, which differences result in a different and reliable mode of operation and the elimination of many difficulties. Also contemplated by the present invention is a further change in the previously known gravity meter which results in improved sensitivity and reliability without regard to the type of circuit employed. This change resides in the manner in which the movable plate is mounted at the end of a long leaf spring, the other end of which is secured to a fixed support in the gravity meter. By the employment of this spring, a greater change in distance between the plates of the condenser for a given change in gravity can be brought about while substantially preserving the relation between the plates. This construction has the further advantage, particularly over the use of a helical spring, that it serves to maintain the plates of the condenser in fixed lateral relation.

The modes of operation described above and the advantages peculiar to the gravity meter of the present invention will be better appreciated from the following detailed description of the accompanying drawings in which Fig. 1 is a side elevation of the gravity sensitive elements of the gravity meter of the present invention independently of the measuring circuit;

Fig. 2 is a diagrammatic representation of one embodiment of a measuring circuit according to the present invention;

Fig. 3 is a diagrammatic representation of the preferred embodiment of a measuring circuit according to the present invention; and Fig. 4 is a diagrammatic representation of a modification of the preferred embodiment of a measuring circuit according to the present invention.

With reference to Fig. 1, it will be understood that the parts shown are enclosed in a suitable container which is provided with heat insulation and with a thermostat, if necessary, the purpose of which is to keep the temperature constant inside the container and eliminate changes due to temperature in the moving parts of the gravity meter. This figure illustrates those elements of the gravity meter which are important for the description of the present invention and which consist of a base plate 1 on which is mounted an inclined arm 2, upon the free end of which is fixed a steel plate 3 by suitable adjusting screws 4. This plate is a stainless steel plate about one inch in diameter. A leaf spring 5 has one of its ends connected to a standard 6 carried by arm 2 and carries at its other end a second plate 7 which is identical with plate 3. The standard 6 is insulated from arm 2 by insulation 8. This standard constitutes a terminal for one of the leads 9 connecting the condenser in an oscillating circuit. The other lead 9 is connected to a terminal carried by arm 2 which terminal is connected by a conductor 10 to plate 3.

In Fig. 2 is shown a circuit which is composed of an oscillator 11 which includes the condenser composed of plates 3 and 7, connected in series with an inductance coil 12. A second condenser 13 having a capacity the same as the gravity meter condenser at its base station is arranged in series with the coil. One side of each of the condensers is open and adapted that either of the condensers can be connected into the circuit by a switch 14. This circuit is maintained in oscillation by a vacuum tube 15 the grid 16 of which is connected to coil 12 and the plate 17 of which is connected to a battery 18 through a coil 19 which is arranged in inductive relation to coil 12. The oscillating circuit is connected with a vacuum tube amplifier 20 of the type usually used for this purpose. The amplifier 20 is connected to apparatus 21 which includes conventional means for mixing the current from oscillator 11 with the current from a second oscillator 22 of conventional design, which is also provided with an amplifier 23, and means for recording a beat frequency of these two currents.

As previously explained, with gravity meter condenser 3—7 in the circuit of oscillator 11, the variable condenser in oscillator 22 is adjusted until the beat frequency between the two oscillators is zero. The scale reading of the variable capacity is recorded. Then the switch 14 is manipulated to place the fixed condenser 13 in the circuit of oscillator 11 and the variable condenser of oscillator 22 is again adjusted to zero beat frequency, and the scale reading is recorded.

The difference in these two recorded scale readings of the variable condenser of oscillator 22 is taken as a measure of gravity. The oscillating circuits shown are elementary and other circuits, of higher stability, may be used.

In Fig. 3, parts corresponding to parts shown in Fig. 2 bear the same numerals. It will be noted that the only difference between the two circuits is the inclusion of variable condenser 24 in the circuit of oscillator 11 in parallel with the gravity meter condenser. This additional element makes possible the different mode of operation hitherto described in which changes in the value of the circuit constants of the two oscillators and the supplemental equipment are eliminated as factors capable of influencing the accuracy of the gravity measurements.

In Fig. 4, parts corresponding to parts shown in Figs. 2 and 3 bear the same numerals. It will be noted that the only difference between this circuit and the circuit shown in Fig. 3 is that condenser 24, instead of being arranged in parallel with the gravity meter condenser, is arranged in parallel with inductance 12, so that it is included in the measuring oscillating circuit when either the gravity meter condenser or condenser 13 is in this circuit.

The above description is directed to an apparatus in which changes in capacity in a condenser having a plate movable by gravity are utilized for gravity measurements. It will be apparent that changes in mutual inductance in a pair of coils, one of which is mounted for movement by gravity toward the other, can also be utilized for the same purpose. In such a case, plates 3—7 of Fig. 1 would be replaced by inductance coils, inductance 12 of Fig. 2 would be replaced by a condenser, and condenser 13 would be replaced by an inductance coil, the inductance coil 19 being arranged inductively with the coils substituted for condenser 13 and 7—3, and in Fig. 3 variable condenser 19 would be replaced by a variable inductance. Likewise, one inductance coil mounted for movement by gravity in a magnetic field can be utilized. In the appended claims, therefore, both condensers and inductances will be embraced in the term "reactance."

It will be understood that changes may be made in the above described embodiments without departing from the scope of this invention. For example, the reference frequency need not be generated by the type of oscillator shown, but may be generated by a crystal. Likewise, the circuits shown may be modified by the addition of known expedients, for increasing accuracy, stability and control-ability. All such changes are contemplated within the scope of the appended claims in which it is intended to claim this invention as broadly as the prior art permits.

I claim:

1. A gravity meter comprising, in combination, a condenser, one plate of which is movable in response to changes in gravity in a manner to change the value of the capacity of said condenser, a fixed condenser equal in capacity to the aforesaid condenser at a base station, an oscillator comprising an oscillating circuit, means for selectively connecting one or the other of said condensers in said circuit, a second oscillator, means for beating the frequency of said oscillators one against the other, said second oscillator including means for adjusting the frequency thereof when either of said condensers is in the circuit of said first oscillator, whereby any change in the frequency of said first oscillator occasioned by alternately connecting said condensers in said first oscillating circuit at a field station constitutes a measure of the difference in gravity between said field station and the base station.

2. A gravity meter according to claim 1 in which the first mentioned oscillator includes as a permanent element of its circuit a variable condenser in parallel with each of the aforesaid condensers.

3. A gravity meter according to claim 1 in which the first mentioned oscillator includes a variable condenser which is arranged in parallel only with the gravity meter condenser and is in the oscillating circuit only when the latter is in said circuit.

4. An instrument for making geophysical measurements in which small displacements caused by a force being studied are to be measured comprising a base, a post mounted on said base, an arm extending laterally of said post, a plurality of screws projecting through the outer end of said arm, a plate carried by the end of said screws, a leaf spring extending laterally from said post in a plane above the plane of said arm, a plate identical in shape and size with said first named plate carried by the free end of said spring in superimposed relation to said first plate, and means for connecting said plates to a capacity measuring circuit.

5. A gravity meter comprising, in combination, a reactance, one element of which is movable in response to changes in gravity in a manner to change the value of the reactance, a fixed reactance equal in value and kind to the aforesaid reactance at a base station, an oscillator comprising an oscillating circuit, means for selectively connecting one or the other of said reactances in said circuit, a second oscillator, means for beating the frequency of said oscillators one against the other, said second oscillator including means for adjusting the frequency thereof to zero beat with the frequency of said first oscillator when either of said reactances is in the circuit of said first oscillator, whereby any change in the frequency of said first oscillator occasioned by alternately connecting said reactances in said circuit at a field station constitutes a measure of the difference in gravity between said field station and the base station.

HUGHES M. ZENOR.